(12) United States Patent
Nguyen et al.

(10) Patent No.: US 8,862,761 B1
(45) Date of Patent: Oct. 14, 2014

(54) METHOD AND SYSTEM FOR FORMING AN AUDIO OVERLAY FOR STREAMING CONTENT OF A CONTENT DISTRIBUTION SYSTEM

(75) Inventors: Diem V. Nguyen, Anaheim, CA (US); Noreen Fong, Cerritos, CA (US); Mark C. Guidarelli, Sherman Oaks, CA (US); Titus Winters, New York, NY (US)

(73) Assignee: The DIRECTV Group, Inc., El Segundo, CA (US)

( * ) Notice: Subject to any disclaimer, the term of this patent is extended or adjusted under 35 U.S.C. 154(b) by 670 days.

(21) Appl. No.: 12/881,016

(22) Filed: Sep. 13, 2010

Related U.S. Application Data (60) Provisional application No. 61/242,343, filed on Sep. 14, 2009.

(51) Int. Cl.
*G06F 15/16* (2006.01)

(52) U.S. Cl.
USPC ............. 709/231; 725/62; 725/63; 725/64; 725/65; 725/66; 725/67; 725/68; 725/69; 725/70; 725/71; 725/72; 725/109; 725/110; 725/111; 725/112; 725/113; 725/114

(58) Field of Classification Search
USPC ............. 709/231; 725/62–72, 109–114, 725/143–153
See application file for complete search history.

(56) References Cited

U.S. PATENT DOCUMENTS

| | | | | |
|---|---|---|---|---|
| 6,311,161 B1 * | 10/2001 | Anderson et al. | ............. | 704/500 |
| 6,311,181 B1 * | 10/2001 | Lee et al. | ............. | 1/1 |
| 6,594,699 B1 * | 7/2003 | Sahai et al. | ............. | 709/228 |
| 2007/0253558 A1 * | 11/2007 | Song et al. | ............. | 381/56 |
| 2008/0063369 A1 * | 3/2008 | Kim et al. | ............. | 386/95 |

* cited by examiner

*Primary Examiner* — Duyen Doan (57) ABSTRACT

A system and method for a operating a content distribution system includes a destination device and a requesting device that communicates a primary audio stream secondary audio stream and a video stream to the destination device. The destination device communicates the primary audio stream to a display. The destination device includes a secondary decoder configured to decode the secondary audio stream to form a decoded secondary audio stream. The destination device combines the secondary decoded audio stream and the primary audio stream.

22 Claims, 8 Drawing Sheets

METHOD AND SYSTEM FOR FORMING AN AUDIO OVERLAY FOR STREAMING CONTENT OF A CONTENT DISTRIBUTION SYSTEM

CROSS-REFERENCE TO RELATED APPLICATIONS

This application claims the benefit of U.S. Provisional Application No. 61/242,343, filed on Sep. 14, 2009. The entire disclosure of the above application is incorporated herein by reference.

TECHNICAL FIELD

The present disclosure relates generally communicating between a server and a client device, and, more specifically, to providing additional audio track overlays in a content distribution system.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as storage for the operating code of the set top box. Because of the numerous components associated with the set top box, the set top box for each individual television is relatively expensive.

Satellite television systems typically broadcast content to a number of users simultaneously in a system. Satellite television systems also offer subscription or pay-per-view access to broadcast content. Access is provided using signals broadcast over the satellite. Once access is provided, the user can access the particular content.

Electronic devices are increasingly accessing the Internet. In the newest flat panel televisions, Internet connections are provided to enhance the customer experience. For example, various Internet sources such as movie sources and data sources such as weather data and stock data may all be obtained directly from the Internet-connected device.

In the content communication system, multiple audio sources and video sources may be available. Utilizing the audio and video sources in a variety of ways is desirable to users of the system.

SUMMARY

The present disclosure provides a system and method for using multiple audio sources simultaneously.

In one aspect of the disclosure, a method includes communicating a primary audio stream and a video stream to a destination device, communicating the primary audio stream to a display associated with the destination device, configuring a secondary decoder at the destination device for the secondary audio stream, communicating a secondary audio stream to the destination device, decoding the secondary audio stream to form a decoded secondary audio stream and combining the secondary decoded audio stream and the primary audio stream at the destination device.

In a further aspect of the disclosure, a content distribution system includes a destination device and a requesting device that communicates a primary audio stream secondary audio stream and a video stream to the destination device. The destination device communicates the primary audio stream to a display. The destination device includes a secondary decoder configured to decode the secondary audio stream to form a decoded secondary audio stream. The destination device combines the secondary decoded audio stream and the primary audio stream.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system. The communication system may be implemented in a terrestrial system such as a broadband system, cable system or telephone-type system. Optical fiber and wireless distribution may also be used in the broadband distribution system.

Further, many other types of content delivery systems are readily applicable to the disclosed systems and methods. For example, other wireless distribution systems, wired or cable distribution systems, cable television distribution systems, ultra-high frequency/very high frequency radio frequency systems, or other terrestrial broadcast systems may be used. Local multi-point distribution systems, Internet protocol—(IP) based distribution systems, cellular distribution systems, power-line broadcast systems, and point-to-point or multicast Internet protocol delivery networks may be used.

The following disclosure is made with respect to the delivery of video such as television, movies, music videos, and the like. It should also be understood that the systems and methods disclosed herein could also be used for the delivery of any media type, for example, audio, music, data, files, web pages, games, etc. Additionally, throughout this disclosure reference is made to data, information, program, movies, assets, video data, etc. However, it will be readily apparent that these terms are substantially equivalent in reference to the example systems and methods disclosed herein. Therefore, the present disclosure is applicable to the many types of content described above.

Figure 1:
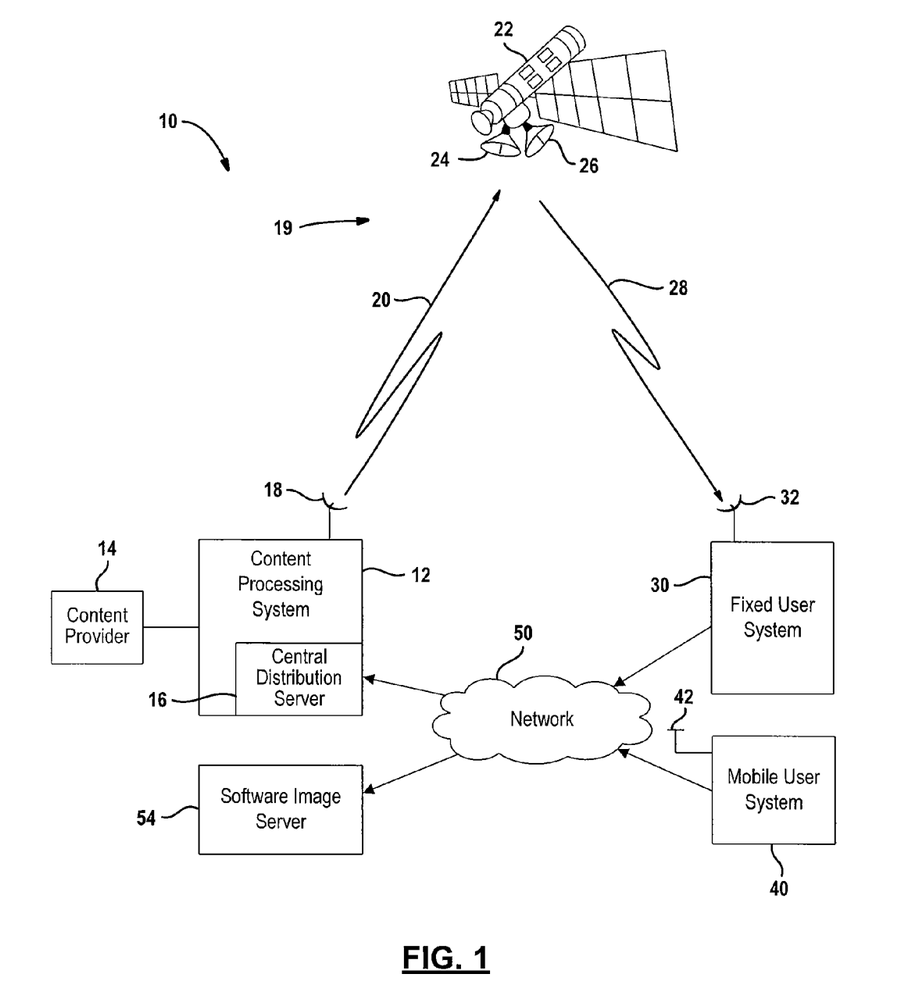
FIG. 1 is a high level block diagrammatic view of a satellite distribution system according to the present disclosure.

Referring now to FIG. 1, a communication system 10 is illustrated. Communication system 10 includes a content processing system 12 that is used as a processing and transmission source. A plurality of content providers 14, only one of which illustrated, may provide content to the content processing system 12. The content processing system 12 receives various types of content from a content provider 14 and communicates the content to system users. The content processing system 12 may also be associated with a central distribution server 16. The central distribution server 16 may be incorporated into the content processing system 12 or may be a separate item. The central distribution server 16 may be used for various types of distribution including resetting a user device, providing a software image or providing an updated software image to a user device. Other uses of the central distribution server 16 will be described below.

The content processing system 12 communicates with various user systems through a content delivery system 19. The content delivery system 19 may be one of the various types of systems such as a wired, wireless, Internet Protocols, cable, high frequency system, etc. described above. In this case, a satellite system is illustrated but should not be considered limiting.

Carrying through with the satellite example, the content processing system 12 includes an antenna 18 for communicating processed content through an uplink 20 to a satellite 22. The satellite 22 may include a receiving antenna 24 and a transmitting antenna 26. The receiving antenna 24 receives the uplink signals 20 from the satellite antenna 18. The transmitting antenna 26 generates downlinks 28 and communicates the downlinks 28 to various user devices.

A fixed user system 30 receives the downlink signals 30 through a receiving antenna 32. The fixed user system 30 is a fixed user system meaning it is stationary. However, some components may be mobile components. The fixed user system 30 may be deployed within a building such as a single-family household, a multi-dwelling unit, or a business. Details of the fixed user system are provided below.

The present disclosure is also applicable to a mobile user system 40. The mobile user system 40 may include a satellite antenna 42. The satellite antenna 42 may be a tracking antenna to account for the mobility of the mobile user system. This is in contrast to the antenna 32 of the fixed user system that may be fixed in a single direction. The mobile user system 40 may include systems in airplanes, trains, buses, ships, and the like.

The fixed user system 30 and the mobile user system 40 may be in communication with a network 50. The network 50 may be a single network or a combination of different networks or different types of networks. The network 50 may, for example, be a broadband wired network or wireless network. The network 50 may be a one-way network so that data or content may be communicated from the fixed user system 30 or the mobile user system 40 through the network 50 to the content processing system 12 and the central distribution server 16. Likewise, the network 50 may also be one-way in the other direction so that the content distribution server 16 may communicate content data or other control signals such as a reset signal through the network 50 to the fixed user system 30 and the mobile user system 40. The network 50 may also be a two-way network so that communications may take place between the content processing system 12, which includes the distribution server 16, and the fixed user system 30 and the mobile user system 40. The network 50 may also be in communication with the software image server 54. The software image server 54 may include memory for storing software images for the fixed user system 30 or the mobile user system 40. The software image server 54 may include boot software images or other software images. The software images may be initial software images or revised software images. The software images within the software image server 54 may also be different versions of software images. The fixed user system 30 and the mobile user system 40 use various data versions of software for testing. The software image server 54 may be incorporated into the content processing system 12 or a separate component or data site that may interconnect to the other parts of the system 10 through the network 50.

Figure 2:
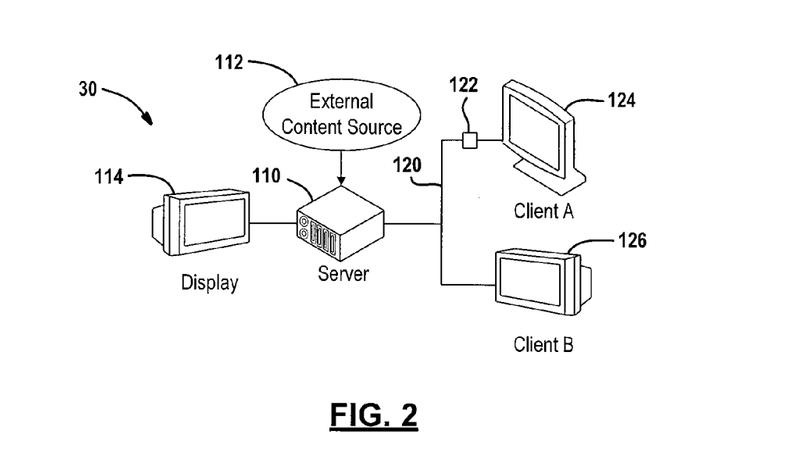
FIG. 2 is a block diagrammatic view of a first network topology.

Referring now to FIG. 2, an example of a fixed user system 30 is illustrated in further detail. The fixed user system 30 may include a local network server 110. The local network server 110 may receive content from an external source 112. The external source 112 may be a satellite distribution system as illustrated in FIG. 1 or the other sources described above. In such a case, the external source 112 may be the satellite antenna 32 illustrated in FIG. 1. The external source 112 may be a variety of television signal sources such as an over-the-air tuner, a cable, a wireless system, or an optical system. Various types of signals such as data, music, video, games, audio, and combinations thereof may be part of the external source.

The server device 110 may act as a set top box for directly communicating content to a display 114. The content in a direct connect may not be renderable content but rather directly displayable signals within a frequency band. The signals to display 114 may also be renderable. The display 114 may be a television or monitor.

The server 110 may also be in communication with a local area network 120. Although wired connections are illustrated, wireless or optical signals may be used for communicating through the local area network 120. The server device 110 may also communicate with the network 50 illustrated in FIG. 1. In that case, the network 50 is an external network when compared to local area network 120. The local area network of FIG. 2 is formed through the server 110. That is, the server 110 acts to communicate to both clients A and B as well as acts as an intermediary if client A communicates with Client B, or vice versa.

The server device 110 may communicate with a first client, Client A, using a client device 122. The server device 110 may stream content signals to the client device 122. The server device 110 may also control the display of content and screen displays or remote user interfaces at the client device. The remote user interface may be a graphical user interface for controlling various selections or controls. The client device 122 may perform various functions that will be described below. For example, the client device 122 may render renderable signals from the server for displaying the rendered signals on a display 124 associated with the client device 122. The client device 122 may also select the content and controls from the user interface and communicate the control signals to the server device 110.

A second client, Client B, may also be in communication with the server 110 through the local area network 120. Client B may contain an internal client device, not shown, for displaying rendered signals on the display 126. The internal client device may be functionally equivalent to the standalone client device 122. Because both the first client, Client A, and the second client, Client B, are in communication directly with the server 110, the network may be referred to as a closed network. Various numbers of clients may be connected to the local area network 120.

Figure 3:
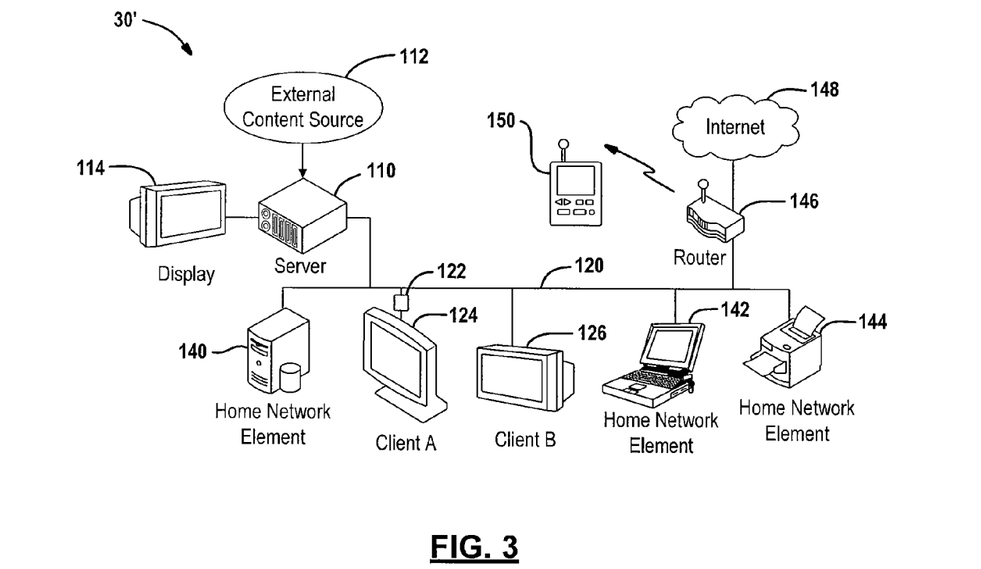
FIG. 3 is a block diagrammatic view of a second embodiment of the network topology.

Referring now to FIG. 3, a fixed user system 30' which is an open network is illustrated. In this example, the same components described above in FIG. 2 are provided with the same reference numerals. In this example, the local area network 120 may include a number of home network elements. One home network element may be a home network server 140 or other computing device. Another home network element may include a laptop computer 142 that is in communication with the local area network 120. Another home network element may include a network printer 144 and a router 146. The router 146 may communicate with other devices through an external network such as the Internet 148.

The fixed user system 30 may also have wireless elements associated therewith. The router 146 or another network device may generate wireless signals that allow a wireless device 150 to communicate with at least one server 110 or 140. The wireless device 150 may, for example, be a personal digital assistant, a cellular phone, a personal media device or a Blu-Ray or DVD player. Of course, other wireless devices may be part of the network.

Figure 4:
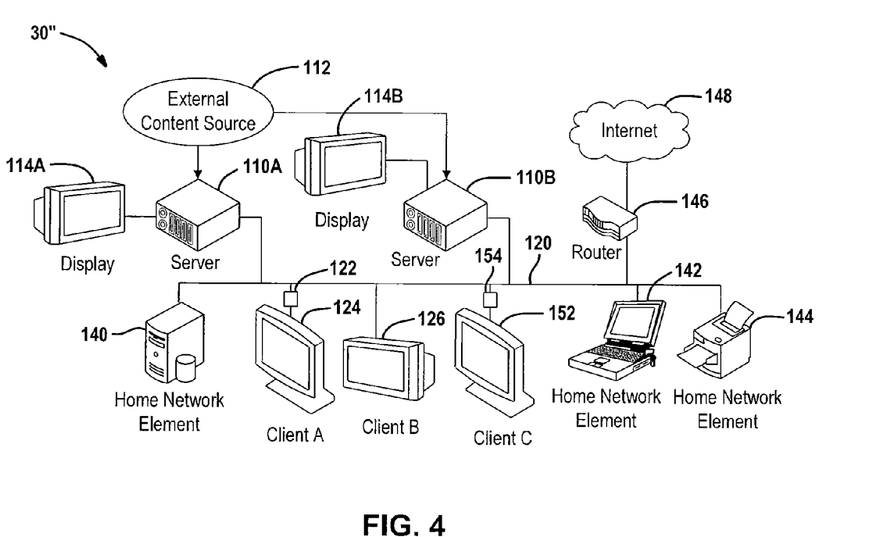
FIG. 4 is a block diagrammatic view of a third embodiment of a network topology.

Referring now to FIG. 4, another example of a fixed user system 30" is illustrated. In this embodiment, the same elements from FIGS. 2 and 3 are provided with the same reference numerals. The local area network 120 may also include two servers 110A and 110B. Each server may include an optional display device 114A, 114B, respectively. In this embodiment a third client, Client C, is illustrated having a display 152 and a client device 154.

Figure 5:
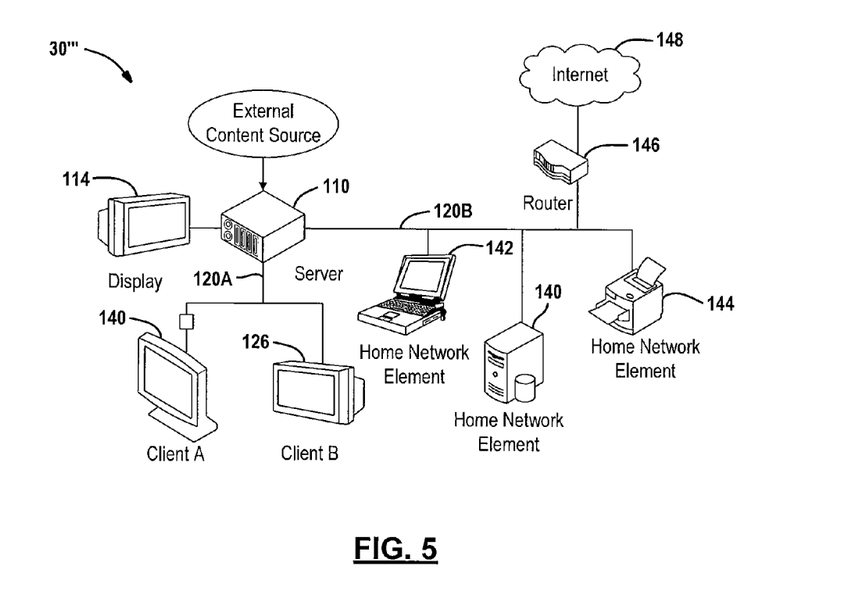
FIG. 5 is a block diagrammatic view of a fourth embodiment of a network topology.

Referring now to FIG. 5, providing customers with reliable service is important. A fourth example of the fixed user system 30''' is illustrated. In certain cases, a home network may not be as reliable as a direct connection. In FIG. 5, the local area network is divided into a first local area network 120A between the first client, Client A, the second client, Client B, and the server 110. That is, the server 110 communicates through the first local area network 120A with both Client A and Client B and any other clients that may be on the system. A second local area network 120B may communicate with other devices within the home network such as the computer 140, the laptop computer 142, the printer 144 and the router 146.

Figure 6:
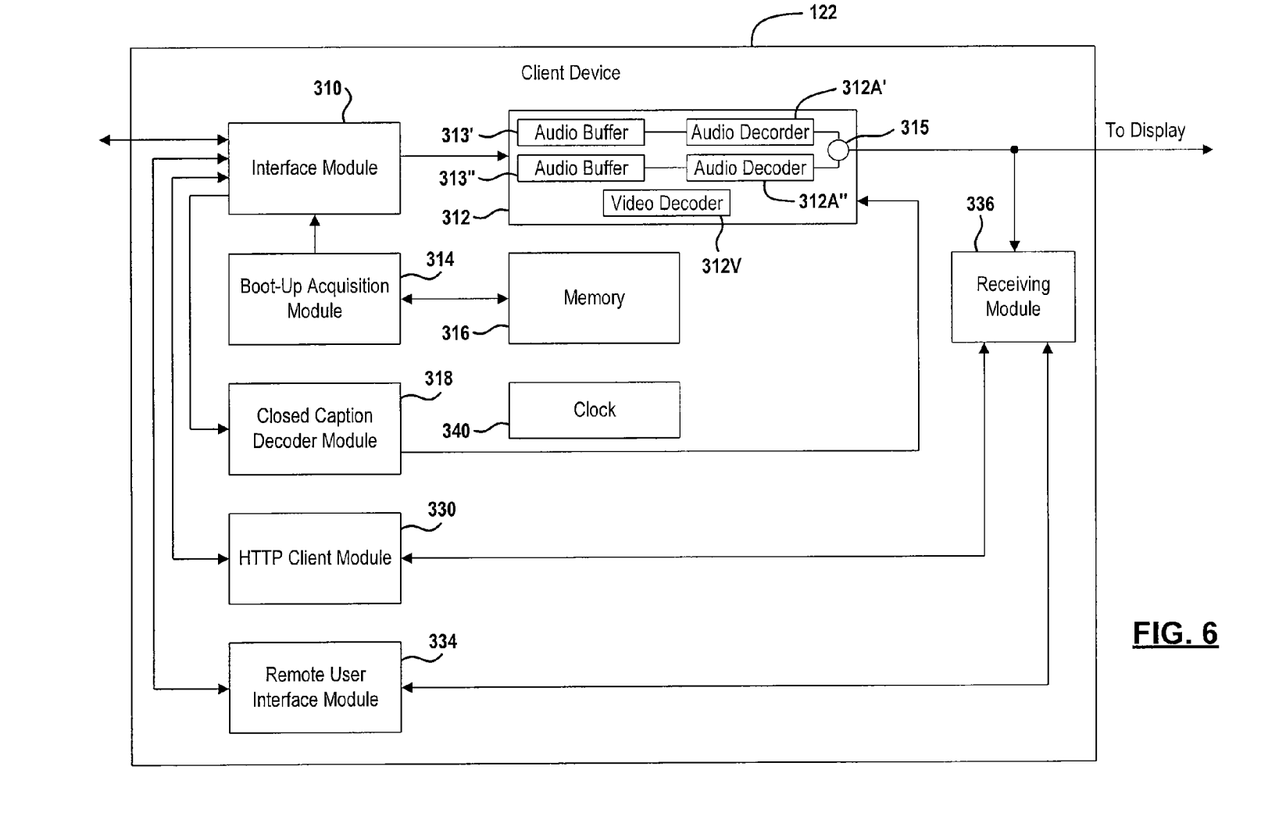
FIG. 6 is a simplified block diagrammatic view of a client device.

Referring now to FIG. 6, a client device 122 is illustrated in further detail. The client device may include various component modules for use within the local area network and for displaying signals. The display of signals may take place by rendering signals provided from the network. It should be noted that the client device 122 may comprise various different types of devices or may be incorporated into various types of devices. For example, the client device 122 may be a standalone device that is used to intercommunicate between a local area network and the server 110 illustrated in FIGS. 2-5. The client device 122 may also be incorporated into various types of devices such as a television, a video gaming system, a hand-held device such as a phone or personal media player, a computer, or any other type of device capable of being networked.

The client device 122 may include various component modules such as those illustrated below. It should be noted that some of the components may be optional components depending on the desired capabilities of the client device and fixed user system. It should also be noted that the client device may equally apply to the mobile user system 40 of FIG. 1.

The client device 122 includes an interface module 310. The interface module 310 may control communication between the local area network and the client device 122. As mentioned above, the client device 122 may be integrated within various types of devices or may be a standalone device. The interface module 310 may include a rendering module 312. The rendering module 312 receives formatted signals through the local area network that are to be displayed on the display. The rendering module 312 merely places pixels in locations as instructed by the formatted signals. The rendering module 312 will allow consistent customer experiences at various client devices. The rendering module 312 communicates rendered signals to the display of the device or an external display.

The rendering module 312 may include a primary audio decoder 312A', a secondary audio decoder 312A" and a video decoder 312V. The audio decoders 312A' and 312A" may render the renderable data from the server device and communicate the audio signal to the display for communication to a user through a speaker or other audio device.

The rendering module 312 may also include a primary audio buffer 313' and a secondary audio buffer 313". The primary audio buffer may buffer audio signals prior to the decoder 312A'. The secondary audio buffer 313" may buffer signals prior to the secondary audio decoder 312A". The audio buffers may be various sizes including a size to fully store a secondary audio signal.

A mixer 315 may also be included within the rendering module 312. The mixing module may also be external to the rendering module. Likewise, the audio buffers 313' and 313" may be external to the rendering module 312. The mixing module 315 may mix the signals from the audio decoder 312A' and the secondary audio decoder 312A". Thus, the signal from the secondary audio decoder 312A" may be overlayed on the primary audio decoder signal.

The decoder module 312V may decode the signal for rendering on a video display. Each decoder 312A, 312V decodes the renderable data from the server device. The decoders are simplistic in that they merely extract the data from the Internet protocol signals provided by the server device.

A boot-up acquisition module 314 may provide signals through the interface module 310 during boot-up of the client device 122. The boot-up acquisition module 314 may provide various data that is stored in memory 316 through the interface module 310. The boot-up acquisition module 314 may provide a make identifier, a model identifier, a hardware revision identifier, a major software revision, and a minor software revision identifier. Also, a download location for the server to download a boot image may also be provided. A unique identifier for each device may also be provided. However, the server device is not required to maintain a specific identity of each device. Rather, the non-specific identifiers may be used such as the make, model, etc. described above. The boot-up acquisition module 314 may obtain each of the above-mentioned data from memory 316.

A closed-caption decoder module 318 may also be included within the client device 122. The closed-caption decoder module 318 may be used to decode closed-captioning signals. The closed-captioning decoder module 318 may also be in communication with rendering module 312 so that the closed-captioning may be overlayed upon the rendered signals from the rendering module 312 when displayed upon the display associated with the client device.

Communications may take place using HTTP client module 330. The HTTP client module 330 may provide formatted HTTP signals to and from the interface module 310.

A remote user interface module 334 allows clients associated with the media server to communicate remote control commands and status to the server. The remote user interface module 334 may be in communication with the receiving module 336. The receiving module 336 may receive the signals from a remote control associated with the display and convert them to a form usable by the remote user interface module 334. The remote user interface module 334 allows the server to send graphics and a second audio signal to provide a full featured user interface within the client. HTTP commands may be used for primary audio and primary video in this example. Screen displays may be generated based on the signals from the server. Thus, the remote user interface module 334 may also receive data through the interface module 310. It should be noted that modules such as the rendering module 312 and the remote user interface module 334 may communicate and render both audio and visual signals.

A clock 340 may communicate with various devices within the system so that the signals and the communications between the server and client are synchronized and controlled.

Figure 7:
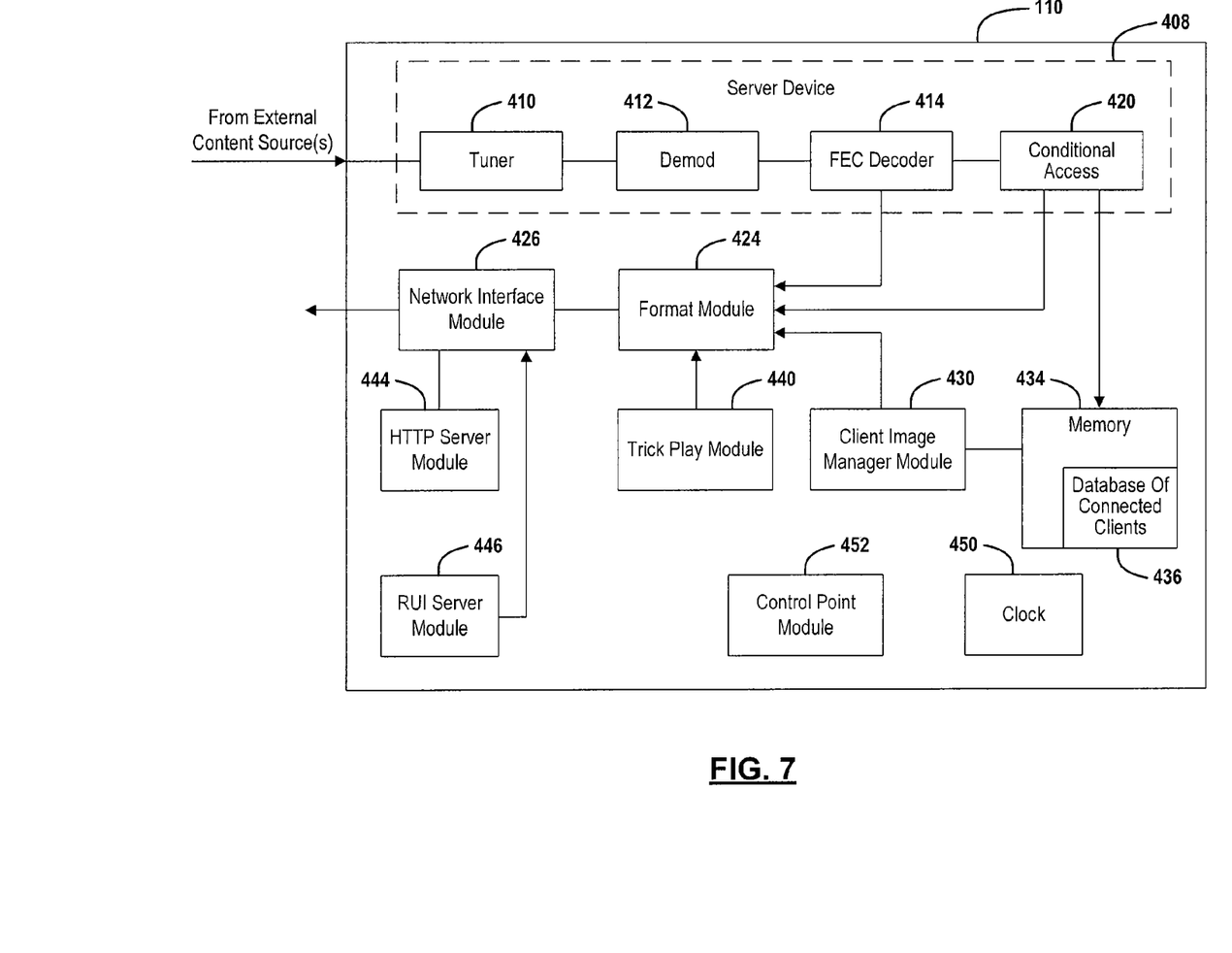
FIG. 7 is a block diagrammatic view of a server device.

Referring now to FIG. 7, a server 110 is illustrated in further detail. The server 110 is used for communicating with various client devices 122. The server 110, as mentioned above, may also be used for communicating directly with a display. The server 110 may be a standalone device or may be provided within another device. For example, the server 110 may be provided within or incorporated with a standard set top box. The server 110 may also be included within a video gaming system, a computer, or other type of workable device. The functional blocks provided below may vary depending on the system and the desired requirements for the system.

The server device 110 may be several different types of devices. The server device 110 may act as a set top box for various types of signals such as satellite signals or cable television signals. The server device 110 may also be part of a video gaming system. Thus, not all of the components are required for the server device set forth below. As mentioned above, the server device 110 may be in communication with various external content sources such as satellite television, cable television, the Internet or other types of data sources. A front end 408 may be provided for processing signals, if required. When in communication with television sources, the front end 408 of the server device may include a tuner 410, a demodulator 412, a forward error correction decoder 414 and any buffers associated therewith. The front end 408 of the server device 110 may thus be used to tune and demodulate various channels for providing live or recorded television ultimately to the client device 122. A conditional access module 420 may also be provided. The conditional access module 420 may allow the device to properly decode signals and prevent unauthorized reception of the signals.

A format module 424 may be in communication with a network interface module 426. The format module may receive the decoded signals from the decoder 414 or the conditional access module 420, if available, and format the signals so that they may be rendered after transmission through the local area network through the network interface module 426 to the client device. The format module 424 may generate a signal capable of being used as a bitmap or other types of renderable signals. Essentially, the format module 424 may generate commands to control pixels at different locations of the display.

The server device 110 may also be used for other functions including managing the software images for the client. A client image manager module 430 may be used to keep track of the various devices that are attached to the local area network or attached directly to the server device. The client image manager module 430 may keep track of the software major and minor revisions. The client image manager module 430 may be a database of the software images and their status of update.

A memory 434 may also be incorporated into the server device 110. The memory 434 may be various types of memory or a combination of different types of memory. These may include, but are not limited to, a hard drive, flash memory, ROM, RAM, keep-alive memory, and the like.

The memory 434 may contain various data such as the client image manager database described above with respect to the client image manager module 430. The memory may also contain other data such as a database of connected clients 436. The database of connected clients may also include the client image manager module data.

A trick play module 440 may also be included within the server device 110. The trick play module 440 may allow the server device 110 to provide renderable formatted signals from the format module 424 in a format to allow trick play such as rewinding, forwarding, skipping, and the like. An HTTP server module 444 may also be in communication with the network interface module 426. The HTTP server module 444 may allow the server device 110 to communicate with the local area network. Also, the HTTP server module may also allow the server device to communicate with external networks such as the Internet.

A remote user interface (RUI) server module 446 may control the remote user interfaces that are provided from the server device 110 to the client device 122.

A clock 450 may also be incorporated within the server device 110. The clock 450 may be used to time and control the various communications with the various client devices 122.

A control point module 452 may be used to control and supervise the various functions provided above within the server device.

It should be noted that multiple tuners and associated circuitry may be provided. The server device 110 may support multiple client devices 122 within the local area network. Each device is capable of receiving a different channel or data stream. Each client device may be controlled by the server device to receive a different renderable content signal.

Figure 8:
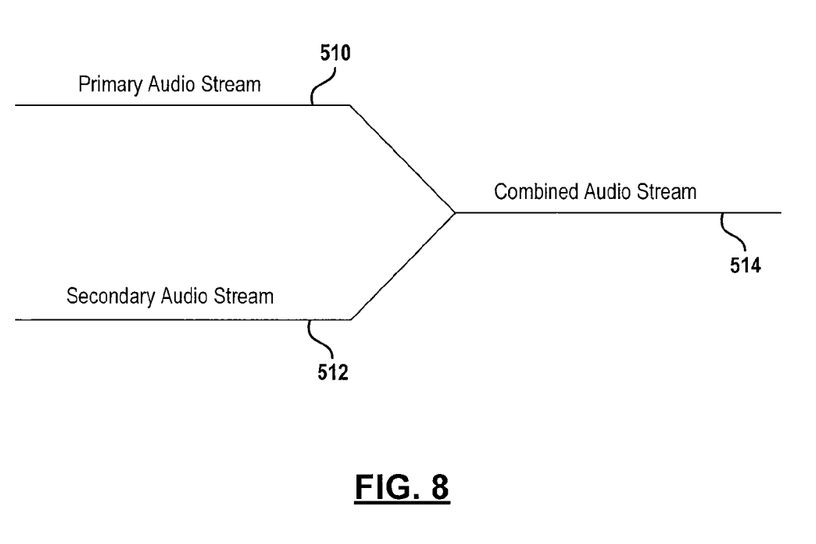
FIG. 8 is a representational view of a primary audio stream and a secondary audio stream together with a combined audio stream which includes the secondary audio stream overlayed on top of the primary audio stream.

Referring now to FIG. 8, a primary audio stream 510 is shown. The primary audio stream 510 may be generated from the primary audio decoder 312A'. A secondary audio stream 512 is also illustrated. The secondary audio stream 512 may be generated from the secondary audio decoder 312A". A combined audio stream 514 is illustrated. The combined audio stream 514 may be generated by the mixer 315 of FIG. 6. The combined audio stream may include the secondary audio stream 512 overlayed on top of the primary audio stream 510. The primary audio stream may be generated from the audio-video stream signal from the transport stream.

Figure 9A:
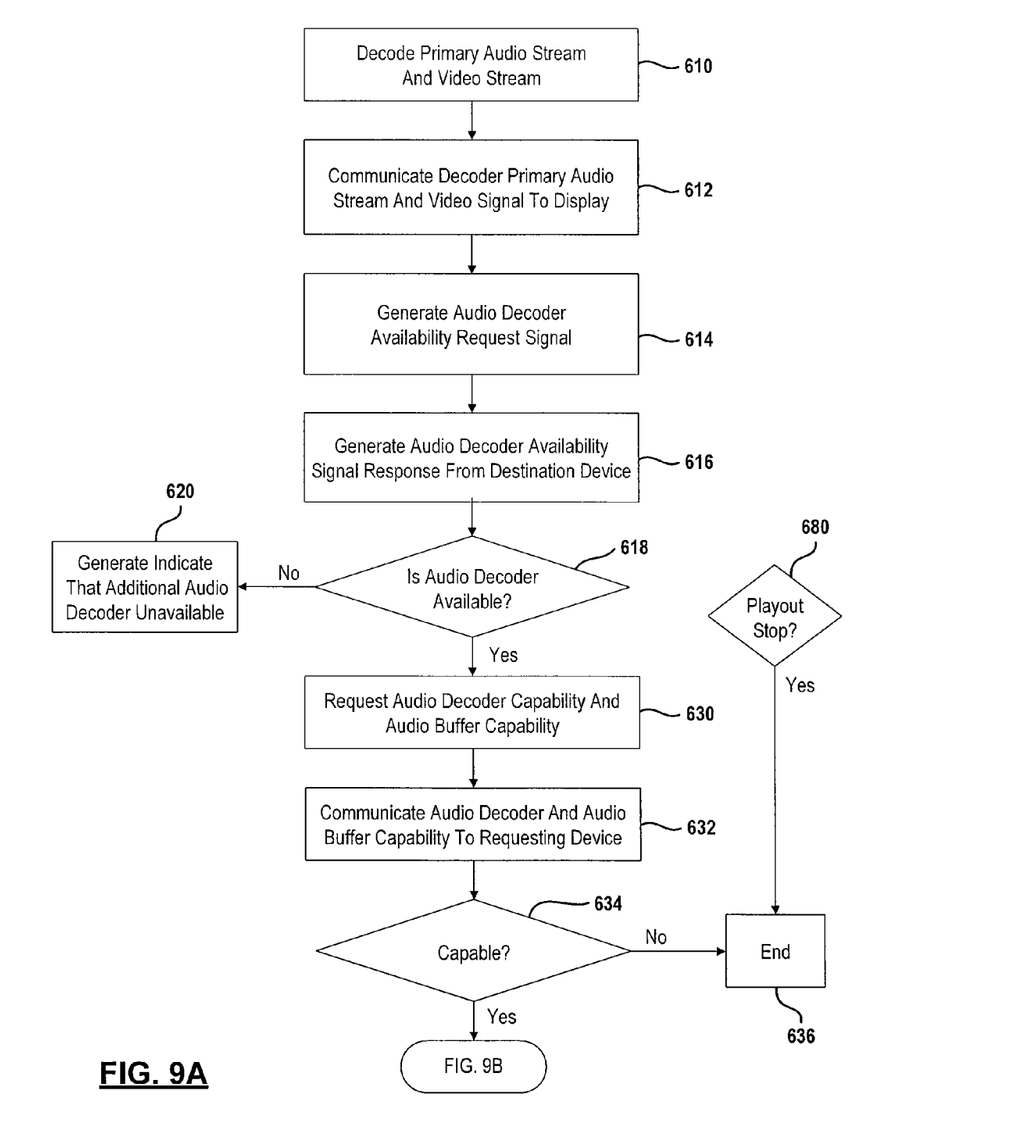
FIGS. 9A and 9B are a continuous block diagrammatic view for overlaying the secondary audio stream on a primary audio stream.
Figure 9B:
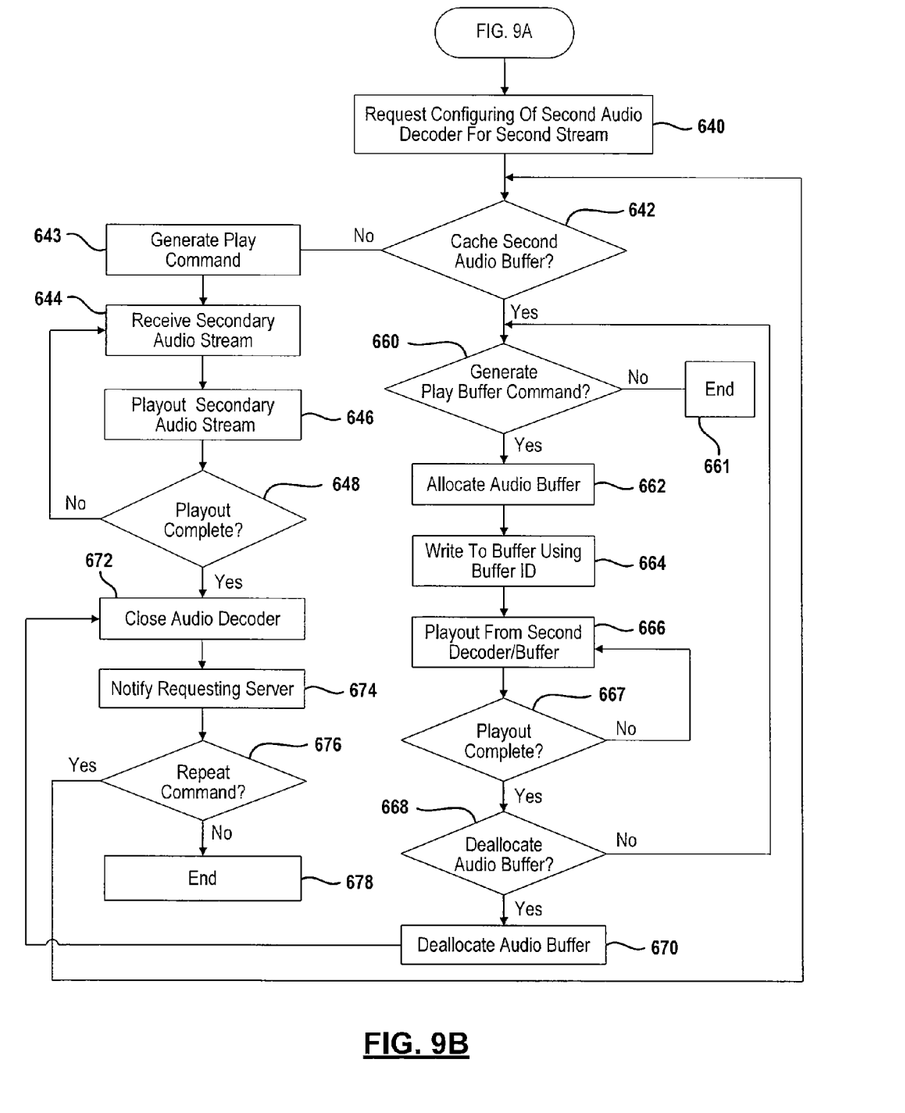

Referring now to FIGS. 9A and 9B, a method for overlaying a secondary audio signal on top of a primary audio signal is illustrated. In step 610, a decoder decodes the primary audio stream and the video stream. These may be received from a transport stream. In step 612, a decoded primary audio stream and decoded video stream may be communicated to the display associated with a destination device. In step 614, an audio decoder availability request signal may be generated from the requesting device to determine if any audio decoders are available. The number of available audio encoders may also be determined. In order to perform the overlay process, a secondary audio decoder is used to process a secondary audio signal. If a secondary audio decoder is not available, an overlay secondary signal may not be generated. In step 616, a response from the destination device corresponding to the number of audio decoders or an availability of an audio decoder is generated. The response from the destination device may be an audio decoder availability signal. In step 618, when an audio decoder is not available, step 620 may be performed. In step 620, an indicator may be generated that an additional audio decoder is not available. An indicator may be generated at the requesting device or may be generated to provide feedback to a user at a destination device.

In step 618, when the audio decoder is available, step 630 is performed. In step 630, the audio decoder capability and audio buffer capability may be determined. Step 630 generates a request signal from the requesting device to the destination device to determine the capability of the decoder and the buffer. An audio capability request signal and buffer capability request signal may be generated and communicated separately or together. The requesting device desires the determination of whether the audio decoder is capable of decoding the secondary audio signal and whether the audio buffer is capable of storing the secondary audio buffer signal. In step 632, an audio decoder capability and audio buffer capability are communicated in an audio decoder capability signal and an audio buffer capability signal from the destination device to the requesting device. In step 634, it is determined whether or not the audio decoder or audio buffer is capable of the secondary audio signal. If the audio decoder or buffer is not capable, step 636 ends the process.

In step 634, if the buffer and decoder are capable of a secondary audio source, step 640 is performed. In step 640, the requesting device may request the opening of the secondary audio decoder for the secondary stream. The second audio stream may or may not be cached. In step 642, it is determined whether or not the second audio signal or stream is to be cached. When caching is not desired, step 643 is performed, which generates a play command. When the play command is generated in step 643, a secondary audio stream is communicated from the requesting device to the destination device in step 644. After step 644, step 646 begins playout. In step 648, it is determined whether the playout has been completed. When playout is not complete, step 644 is again performed.

Referring back to step 642, when the second audio stream is to be buffered, it is determined whether a play buffer command has been generated in step 660. If a play buffer command has not been generated in step 660, step 661 ends the process. In step 660, when a play buffer command has been generated, step 662 allocates a buffer for the secondary audio stream. A buffer identifier may be generated for the buffer during buffer allocation in step 662. Step 664 writes the secondary audio stream to the buffer using the buffer identifier. Step 666 plays out the secondary audio stream from a secondary decoder and secondary buffer. After step 666, step 667 is performed to determine whether or not playout is complete. If playout is not complete, step 666 is again performed. If playout is complete, step 668 is performed. In step 668, it is determined whether the secondary audio buffer is to be de-allocated. In step 670, if the buffer is not to be de-allocated, step 660 is again performed. In step 668, when the buffer is to be de-allocated, step 670 de-allocates the buffer.

After step 670, and when playout is complete in step 648, step 650 is performed. Step 672 closes the secondary audio decoder, if desired. Step 674 then notifies the requesting server that playout is complete. The requesting server may be notified by the destination device by a secondary playout complete signal. When the secondary playout complete signal is communicated from the destination device to the request device, the requesting device may generate a repeat command in step 674. If a repeat command is generated, steps 642-676 are again performed. The same configuration for the buffers and decoder may be used. In step 676, when a repeat command is not generated, step 678 ends the process.

In step 680, it is determined whether or not a playout stop signal has been generated by the requesting device. A playout stop signal may be generated by the requesting device at any time during the process of steps 610-678. Therefore, the playout stop step 680 is shown on the side. If the playout stop signal is generated, the system may stop playing back the secondary request signal and end the process in step 636.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    communicating an audio decoder availability request signal from a requesting device to a destination device;
    communicating an audio decoder availability signal from the destination device in response to the audio decoder availability request signal;
    communicating a primary audio stream and a video stream to the destination device;
    communicating the primary audio stream to a display associated with the destination device;
    when the audio decoder availability signal corresponds to an available decoder, performing the steps comprising:
        configuring a secondary decoder at the destination device for a secondary audio stream;
        communicating the secondary audio stream to the destination device;
        decoding the secondary audio stream to form a decoded secondary audio stream; and
        combining the decoded secondary audio stream and the primary audio stream at the destination device.

2. A method as recited in claim 1 wherein communicating a primary audio stream and a video stream to a destination device comprises communicating the primary audio stream and the video stream to the destination device from a requesting device.

3. A method as recited in claim 1 wherein communicating a primary audio stream and a video stream to a destination device comprises communicating the primary audio stream and the video stream to the destination device from a requesting server through a local area network.

4. A method as recited in claim 1 further comprising generating an unavailable indicator when the secondary decoder is not available.

5. A method comprising:
    communicating an audio decoder capability request signal from a requesting device to a destination device;
    communicating an audio decoder capability signal from the destination device in response to the audio decoder capability request signal;

communicating a primary audio stream and a video stream to the destination device;
communicating the primary audio stream to a display associated with the destination device;
when the audio decoder capability signal corresponds to a secondary decoder having a capability to decode a secondary audio stream, performing the steps of:
configuring a secondary decoder at the destination device for a secondary audio stream;
communicating the secondary audio stream to the destination device;
decoding the secondary audio stream to form a decoded secondary audio stream; and
combining the decoded secondary audio stream and the primary audio stream at the destination device.

6. A method comprising:
communicating an audio buffer capability request signal from a requesting device to a destination device;
communicating an audio buffer capability signal from the destination device to the requesting device in response to the audio buffer capability request signal;
communicating a primary audio stream and a video stream to the destination device;
communicating the primary audio stream to a display associated with the destination device;
when the audio buffer capability signal corresponds to having capability to buffer a secondary audio stream, performing the steps comprising:
configuring a secondary decoder at the destination device for a secondary audio stream;
communicating the secondary audio stream to the destination device;
decoding the secondary audio stream to form a decoded secondary audio stream; and
combining the decoded secondary audio stream and the primary audio stream at the destination device.

7. A method as recited in claim 1 wherein combining the secondary audio stream and the primary audio stream comprises combining the secondary audio stream and the primary audio stream at the destination device from a secondary audio buffer.

8. A method as recited in claim 1 wherein combining the secondary audio stream and the primary audio stream comprises combining the secondary audio stream and the primary audio stream when the secondary audio stream is fully stored within a secondary audio buffer.

9. A method as recited in claim 1 wherein combining the secondary audio stream and the primary audio stream comprises combining the secondary audio stream and the primary audio stream from a secondary audio buffer in response to a playback command from a requesting device.

10. A method as recited in claim 1 further comprising communicating the secondary audio stream from a requesting device to the destination device.

11. A method as recited in claim 1 further communicating a secondary playout complete signal from the destination device to the requesting device.

12. A method as recited in claim 11 further comprising communicating a secondary playout stop signal from the requesting device to the destination device prior to the secondary playout complete signal.

13. A communication system comprising:
a destination device; and
a requesting device that communicates a primary audio stream, a secondary audio stream and a video stream to the destination device;
wherein the requesting device communicates an audio decoder availability request signal to the destination device;
wherein the destination device communicates an audio decoder availability signal to the requesting device;
wherein when the audio decoder availability signal corresponds to an available decoder, said requesting device configures a secondary decoder for decoding the secondary audio stream to form a decoded secondary audio stream;
wherein the destination device combines the primary audio stream and the secondary audio stream.

14. A system as recited in claim 13 further comprising a local area network wherein the requesting device communicates the primary audio stream and the video stream to the destination device through the local area network.

15. A system as recited in claim 13 wherein the requesting device generates an unavailable indicator when the secondary decoder is not available.

16. A communication system comprising:
a destination device; and
a requesting device that communicates a primary audio stream, a secondary audio stream and a video stream to the destination device;
wherein the requesting device communicates an audio decoder capability request signal to the destination device;
wherein the destination device communicates an audio decoder capability signal corresponding to a capability to decode the secondary audio stream;
wherein said requesting device configures a secondary decoder for decoding the secondary audio stream to form a decoded secondary audio stream in response to the audio decoder capability signal;
wherein the destination device combines the primary audio stream and the secondary audio stream.

17. A communication system comprising:
a destination device; and
a requesting device that communicates a primary audio stream, a secondary audio stream and a video stream to the destination device;
wherein the requesting device communicates an audio buffer capability request signal to the destination device;
wherein the destination device communicates a buffer decoder capability signal corresponding to a capability to decode the secondary audio stream;
wherein said requesting device configures a secondary decoder for decoding the secondary audio stream to form a decoded secondary audio stream in response to the buffer decoder capability signal;
wherein the destination device combines the primary audio stream and the secondary audio stream.

18. A system as recited in claim 13 wherein the destination device comprises a secondary audio buffer.

19. A system as recited in claim 18 wherein the destination device combines the secondary audio stream with the primary audio stream after the secondary audio buffer is full.

20. A system as recited in claim 18 wherein the destination device combines the secondary audio stream with the primary audio stream from the secondary audio buffer in response to a playback command from a requesting device.

21. A system as recited in claim 13 wherein the destination device communicates a secondary playout complete signal to the requesting device.

22. A system as recited in claim 21 wherein the requesting device communicates a secondary playout stop signal to the destination device prior to the secondary playout complete signal.

* * * * *